(12) United States Patent
Chen

(10) Patent No.: US 6,934,113 B1
(45) Date of Patent: Aug. 23, 2005

(54) METHOD AND SYSTEM FOR PROVIDING DYNAMIC ACTUATION OF A WRITE HEAD USING A STRAIN ELEMENT

(75) Inventor: Yingjian Chen, Fremont, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 16 days.

(21) Appl. No.: 10/816,050

(22) Filed: Mar. 31, 2004

(51) Int. Cl.[7] ............................. G11B 21/12; G11B 5/60
(52) U.S. Cl. ........................................ 360/75; 360/294.7
(58) Field of Search .......................... 360/75, 234.4, 360/234.7, 274, 294.7

(56) References Cited

U.S. PATENT DOCUMENTS

| | | | |
|---|---|---|---|
| 3,706,861 A | * | 12/1972 | Giel ............................ 360/75 |
| 5,991,113 A | | 11/1999 | Meyer et al. |
| 6,473,259 B1 | | 10/2002 | Kuo et al. |
| 6,501,606 B2 | | 12/2002 | Boutaghou et al. |
| 6,570,730 B1 | | 5/2003 | Lewis et al. |
| 6,700,724 B2 | | 3/2004 | Riddering et al. |
| 2003/0043497 A1 | | 3/2003 | Riddering et al. |
| 2003/0081359 A1 | | 5/2003 | Pust et al. |
| 2004/0012894 A1 | | 1/2004 | Pust et al. |
| 2004/0257707 A1 | * | 12/2004 | Thurn et al. ............. 360/234.7 |

* cited by examiner

*Primary Examiner*—David Hudspeth
*Assistant Examiner*—James L Habermehl
(74) *Attorney, Agent, or Firm*—Joshua C. Harrison, Esq.; Sawyer Law Group

(57) ABSTRACT

A method and system for actuating a pole tip of a write head is disclosed. The write head includes a first pole and a second pole. The method and system include providing a strain element and providing a coil. The strain element is electrically insulated from the first pole and the second pole. The strain element is further configured to produce a strain for actuating the pole tip in response to a magnetic field. The coil carries a current capable of producing the magnetic field at the strain element.

23 Claims, 3 Drawing Sheets

METHOD AND SYSTEM FOR PROVIDING DYNAMIC ACTUATION OF A WRITE HEAD USING A STRAIN ELEMENT

FIELD OF THE INVENTION

The present invention relates to magnetic recording technology, and more particularly to a method and system for dynamically adjusting the fly height of a write head.

BACKGROUND OF THE INVENTION

In order to write data to media, a write head is typically used. Such a write head is generally part of a merged head that includes a head for writing and a head for reading data from the media. FIG. 1 depicts a side view of a portion of a conventional write head 10. The conventional write head 10 includes a conventional first pole (P1) 12 having a conventional pedestal 14, a conventional write coil 20, a conventional second pole (P2) 30 and a conventional write gap 40 separating the conventional P1 12 from the conventional P2 30. The conventional pedestal 14 and the conventional P2 30 include high saturation magnetization layers 16 and 32, respectively. The conventional write head 10 also includes an insulating layer 22 used to insulate coils 20. The insulating layer 22 is typically a hardbaked photoresist layer. A conventional thermal actuation coil 60 used in actuating the pole tip of the conventional write head 10 is also provided.

In operation the conventional write head 10 is actuated. Stated differently, the fly height, h, of the conventional write head 10 above the air bearing surface (ABS) is controlled. Many conventional mechanisms of actuating the conventional write head 10 exist. For example, the slider on which the conventional write head 10 resides is typically actuated. Other conventional mechanisms of actuation for the write head 100, such as those based on electrostatic or aerodynamics exists. In addition or in lieu of at least some of these mechanisms, the pole tip 50 may be actuated. In the conventional write head 10 shown, the pole tip 50 is thermally actuated. The conventional write head 10 is thus analogous to the system described in U.S. Pat. No. 5,991,113. During writing, a current is driven through the conventional thermal actuation coil 60, which is embedded in the insulating overcoat above the P2 30. This current heats the conventional write head 10. In particular, the overcoat above is heated and, therefore, expands. During expansion, the overcoat draws a portion of the conventional P2 with it, allowing the conventional pole tip 50 to protrude. As a result, the pole tip 50 is actuated, moving closer to the ABS and reducing the fly height in the localized region around the pole tip 50.

Although the conventional write head 10 allows for the pole tip 50 to be thermally actuated, one of ordinary skill in the art will readily recognize that there are drawbacks to use of the conventional write head 10. In order to sufficiently heat the overcoat, the current driven through the conventional thermal actuation coil 60 is quite large, often on the order of a few hundred mA. Driving such a large current consumes a significant amount of power. Such a large current not only heats the overcoat, but may also significantly heat a read sensor (not shown) associated with the conventional write head. This heating can cause failures not only in the overcoat, but also in the read sensor. Furthermore, because of such heating, the bias current driven through the read sensor during reading may have to be reduced, resulting in a loss of signal. Thermal actuation also takes a significant amount of time because both energizing the coil 60 with a sufficient current and sufficient heating of the overcoat are required. Consequently, thermal actuation is relatively slow, approximately in the millisecond regime. Moreover, the expansion of the overcoat occurs primarily above the thermal actuation coil 60. Thus, thermal actuation may be less effective in moving the pole tip 50 closer to the ABS. Stated differently, the amount that the fly height can be adjusted using thermal actuation of the pole tip 50 may be relatively limited.

Accordingly, what is needed is a system and method for improving dynamic actuation of the write head during operation. The present invention addresses such a need.

SUMMARY OF THE INVENTION

The present invention provides a method and system for actuating a pole tip of a write head. The write head includes a first pole and a second pole. The method and system comprise providing a strain element and providing a coil. The strain element is electrically insulated from the first pole and the second pole. The strain element is further configured to produce a strain for actuating the pole tip in response to a magnetic field. The coil carries a current capable of producing the magnetic field at the strain element.

According to the system and method disclosed herein, the present invention provides a mechanism for dynamically adjusting the fly height of the pole tip during operation of the write head.

DETAILED DESCRIPTION OF THE INVENTION

The present invention relates to an improvement in magnetic recording technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for actuating a pole tip of a write head. The write head includes a first pole and a second pole. The method and system comprise providing a strain element and providing a coil. The strain element is electrically insulated from the first pole and the second pole. The strain element is also configured to produce a strain for actuating the pole tip in response to a magnetic field. The coil carries a current capable of producing the magnetic field at the strain element.

The present invention will be described in terms of a write head and particular materials used for forming the strain element. However, one of ordinary skill in the art will readily recognize that the strain element may be used in other heads and that other materials may be used for the strain element. Furthermore, the present invention is described in the context of a particular location for the strain element. However, one of ordinary skill in the art will readily recognize that other locations not inconsistent with the present invention may be used. The present invention is also described in the context of a write head. However, one of ordinary skill in the art will readily recognize that the present invention can be incorporated into a merged or other head. Furthermore, one of ordinary skill in the art will readily recognize that the figures herein are for the purposes of illustration only and thus are not drawn to scale. One of ordinary skill in the art will also readily recognize that the present invention is consistent with both longitudinal and perpendicular recording applications.

Figure 1:
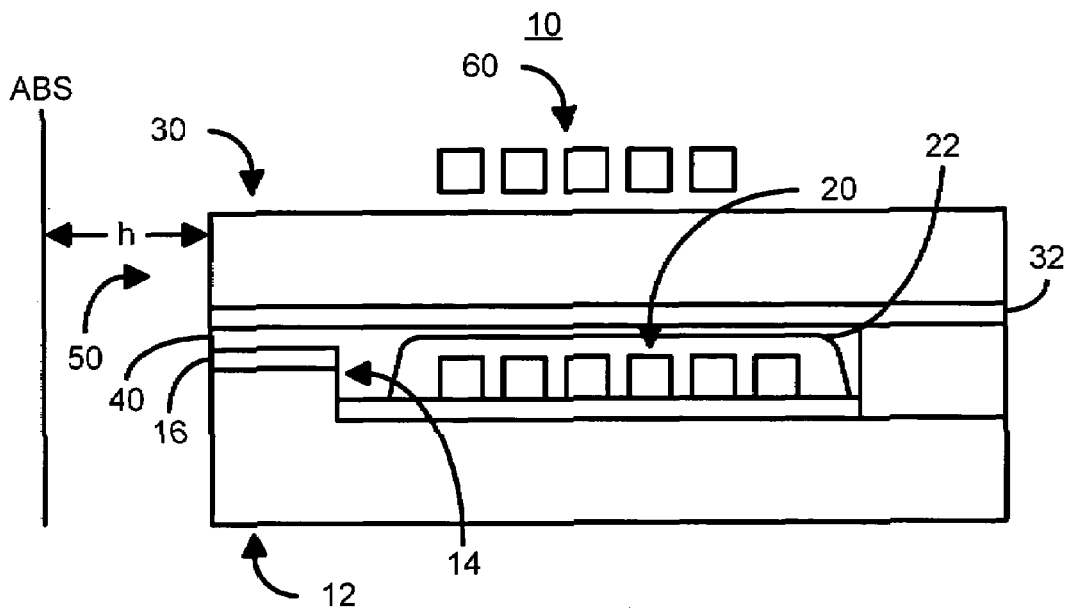
FIG. 1 is a side view of a conventional write head.
Figure 2A:
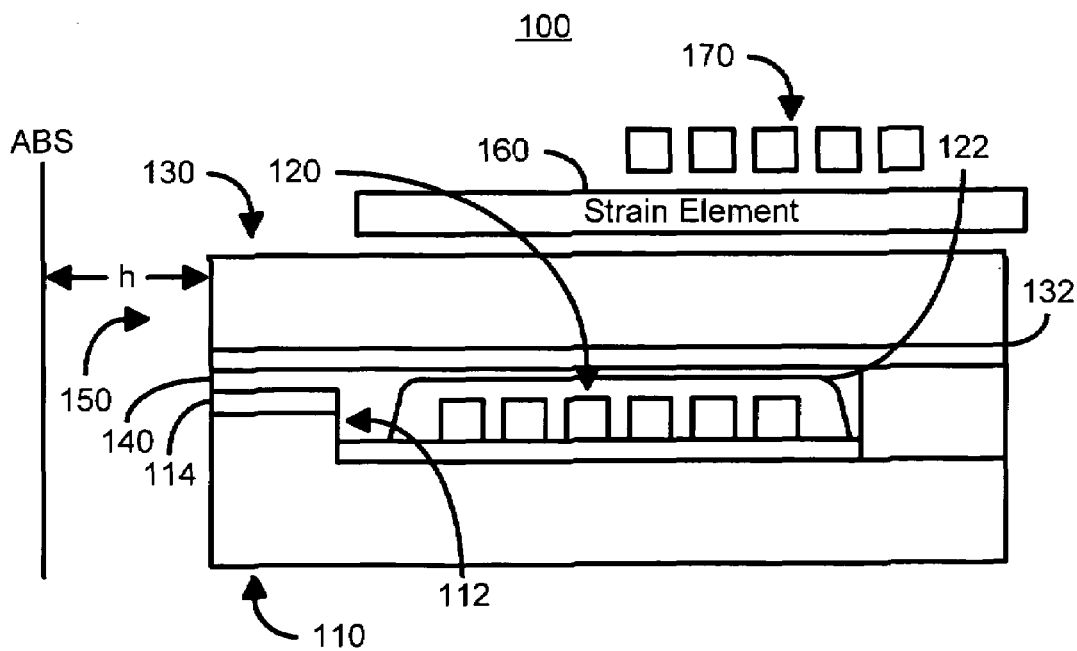
FIG. 2A is a side view of one embodiment of a dynamically actuated write head in accordance with the present invention.
Figure 2B:
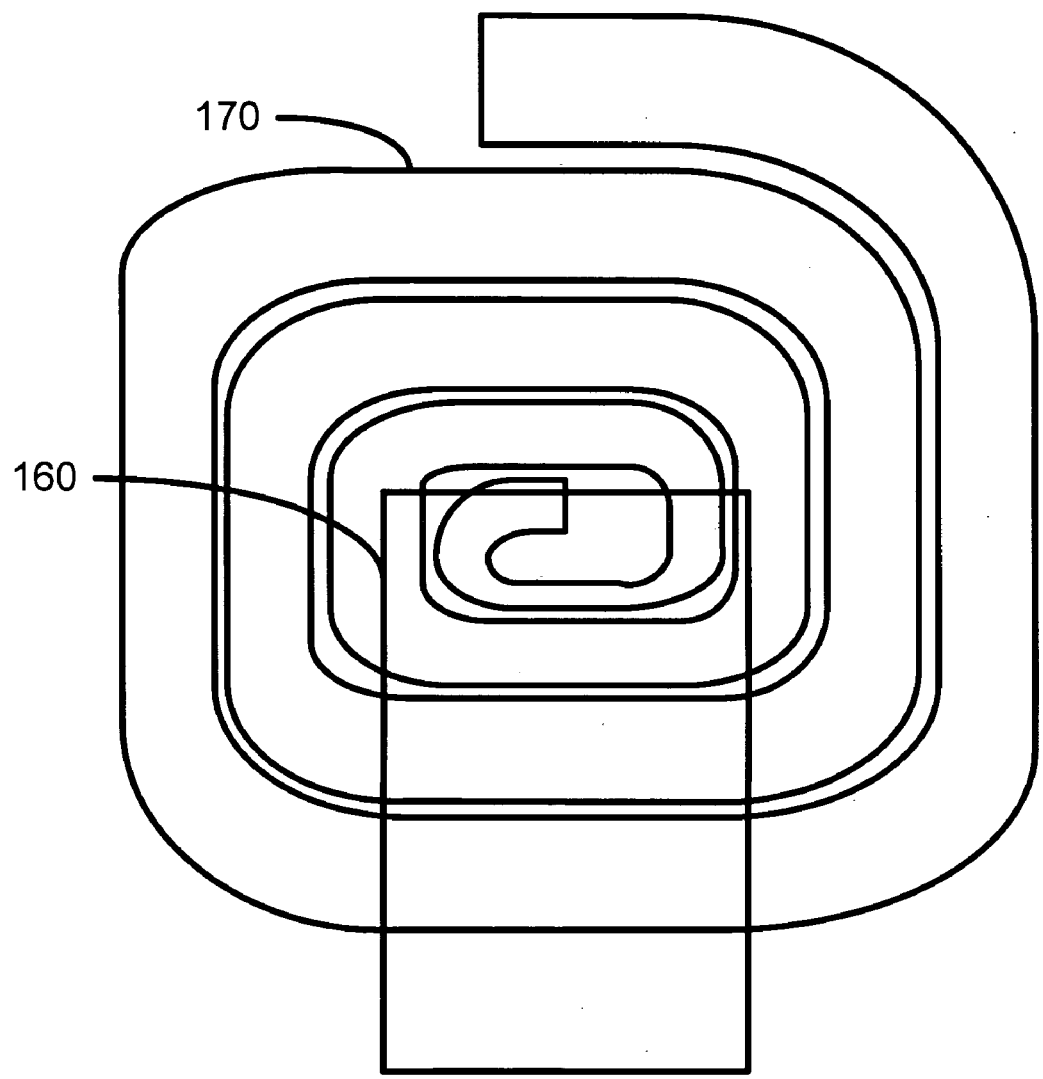
FIG. 2B is a top view of one embodiment of a system for dynamically actuating the write head in accordance with the present invention.

To more particularly illustrate the method and system in accordance with the present invention, refer now to FIGS. 2A and 2B. FIG. 2A is a side view of one embodiment of a write head 100 in accordance with the present invention that can be dynamically actuated using a strain element. The write head 100 is generally incorporated into a merged head including both the write head 100 and a read head (not shown). However, nothing prevents the use of the write head 100 as a separate entity. The write head 100 includes a first pole (P1) 110, a write coil 120, a second pole (P2) 130, a write gap 140, a strain element 160, and a strain element coil 170. FIG. 2B is a top view of the system for dynamically actuating the write head 100 in accordance with the present invention. The system of FIG. 2B includes a strain element 160 and a strain element coil 170 that are also depicted in FIG. 2A.

In the write head 100 depicted in FIG. 2A, the P1 110 includes a pedestal 112 that may have a high saturation magnetization layer 114. Note, however, that nothing prevents the use of a P1 110 that does not include a pedestal or which has different and/or additional layers. The P2 130 may have a high saturation magnetization layer 132, as well as other layers. However, nothing prevents the use of a P2 130 having other and/or different layers as well as a different geometry. The write coil 120 carries a write current during the write cycle of the write head 100. The write current is used in energizing the P1 110 and P2 130 to write to the media. The insulating layer 122, which is generally hard-baked photoresist, insulates the write coil 120. The write gap 140 separates the P1 110 from the P2 130 in the region of the pole tip 150. Thus, the portions of the write head 100 below the strain element 160 may be conventional components. Thus, although particular P1 110, write coil 120, insulation 122, P2 130, and write gap 140 are shown, nothing prevents the use of other and/or additional components in the write head 100.

The strain element 160 and strain element coil 170 are used in dynamically actuating the pole tip 150. As used herein, actuation of the pole tip 150 includes adjusting a position of the pole tip 150 to change the fly height, h, of the write head 100 locally, in the region near the pole tip 150. Thus, during actuation of the pole tip 150, the fly height can be changed locally due to protrusion of the pole tip 150. When the strain element 160 is not used to actuate the pole tip 150, the fly height, h, is generally on the order of 0.3–0.4 $\mu$inch. During actuation, the strain element 160 and strain element coil 170 are used to decrease the fly height below 0.3–0.4 $\mu$inch in the region near the pole tip 150.

In operation, a current is driven through the strain element coil 170. This current generates a magnetic field. The strain element 160 responds to the magnetic field. In particular, the magnetization of the strain element 160 may be aligned towards or away from the ABS, depending upon the direction of current in the coil 170. The strain element 160 thus experiences a field induced strain and/or magnetostriction. As a result, the strain element 160 deforms. This deformation can exert a strain on the P2 130 that actuates the pole tip 150. Thus, when in the presence of an applied magnetic field, the strain element 160 exerts a strain on the pole tip 150 that can locally reduce the fly height in the region of the pole tip 150. In one embodiment, the strain may reduce the fly height by up to approximately fifty percent. Thus, for example, the fly height may be reduced by approximately eighty to a hundred Angstroms. In another embodiment, the fly height in the region of the pole tip 150 may be reduced by twenty to thirty Angstroms. Note that the strain element 160 also exerts a strain on the overcoat between the strain element 160 and the P2 130. However, exerting a strain on the overcoat in this region is beneficial in that a strain in this region is more effective in actuating the pole tip 150.

To provide the desired strain and thus the desired actuation, the strain element 160 includes one or more materials that experience significant strain or magnetostriction in the presence of a magnetic field. Depending upon the materials used, as well as the current driven through the strain element coil 170, the maximum adjustment in the fly height can change. In one embodiment, the strain element 160 includes a NiMnGa Heusler alloy having a tetragonal martensite structure. Such alloys may exhibit a field induced strain of up to approximately six percent due to movement of the martensitic twin boundaries. The strain provided by such a strain element 160 may produce a fly height adjustment of a few percent. In another embodiment, the strain element 160 includes Terfenol-D. Terfenol-D includes materials such as TbDyFe, TbPrFeCo, and TbDyCeFe alloys. In such an embodiment, the strain element 160 may experience magnetostriction of up to seven hundred parts per million. The strain element 160 may also include TbFe/Fe multilayers or TbFe monolayers, which exhibit a magnetostriction of up to one thousand three hundred parts per million. Similarly, FeGa, FeGaAl, or FePd can be used in the strain element 160. Such materials may have a magnetostriction of greater than one hundred parts per million. For example, magnetostriction of up to three hundred fifty parts per million have been reported for FeGa. When NiMnGa Heusler alloys, Terfenol-D, TbFe monolayers, TbFe/Fe multilayers, FeGa, FeGaAl and/or FePd are used, the strain element 160 may undergo magnetostriction sufficient to actuate the pole tip 150 by a desired amount. Moreover, other materials or structures experiencing phenomena such as magnetostriction and/or field induced strain may also be used for the strain element 160. In general, the greater the magnetostriction and/or field induced strain, the greater the range of actuation provided by the strain element 160.

Using the strain element 160 in combination with the strain element coil 170, dynamic actuation of the pole tip 150 is improved. The strain element 160 can exert larger strains on the P2 130 and thus achieve a greater adjustment in the fly height than for many conventional methods of actuation. Because of the localized reduction in fly height around the pole tip 150, the write head 100 is able to produce better-defined magnetic transitions on the media. Moreover, the appropriate current driven through the strain element coil 170 in producing dynamic actuation is expected to be small, in the range of thirty-five to sixty mA. As a result, less power is consumed. Furthermore, the response time for dynamic actuation of the write head 100 depends upon the switching time constant of the strain element coil 170 as well as the magnetization switching time constant of the strain element 160. Such time constants are generally significantly short, typically in the nanosecond regime. As a result, the strain element 160 and strain coil 170 combination can more rapidly actuate the pole tip 150 than other conventional methods such as thermal actuation. Consequently, actuation of the pole tip 150 is improved.

Figure 3:
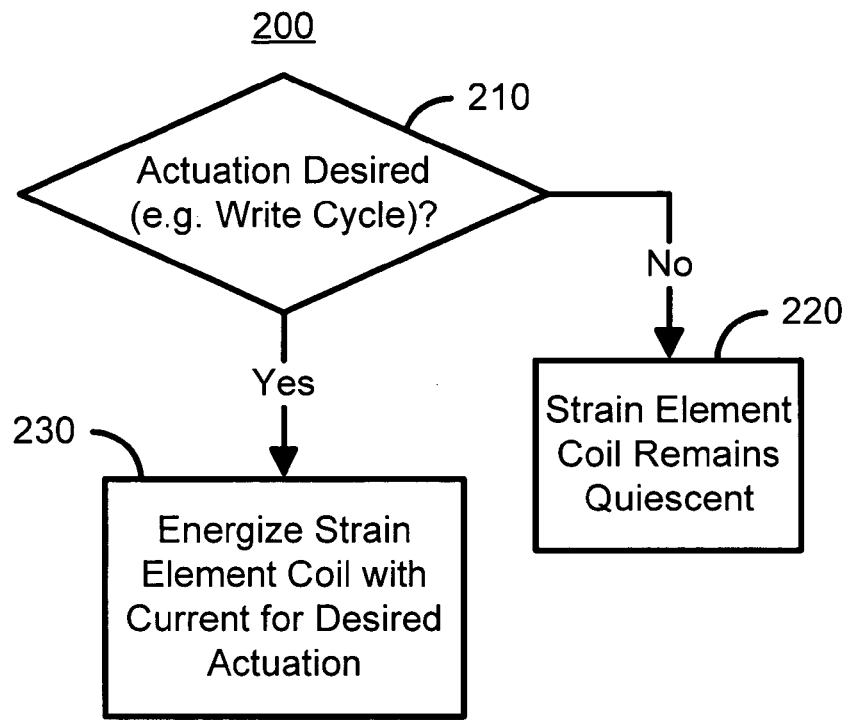
FIG. 3 is a high-level flow chart depicting one embodiment of a method for dynamically actuating a write head using a strain element in accordance with the present invention.

FIG. 3 is a high-level flow chart depicting one embodiment of a method 200 for dynamically actuating a write head using a strain element in accordance with the present invention. The method 200 is preferably performed using a combination of a strain element and a coil, such as the strain element 160 and the strain element coil 170. Thus, the method 200 is described in the context of the strain element 160 and strain element coil 170 as well as write head 100. However, nothing prevents the use of the method 200 with another write head.

Referring to FIGS. 2A, 2B, and 3, it is determined whether actuation is desired, via step 210. In a preferred embodiment, step 210 includes determining whether the write head 100 is undergoing a write cycle. In addition, step 210 may include determining a desired change in the fly height and, therefore, the desired current to be driven through the strain element coil 170. However, in an alternate embodiment, the same current and, therefore, approximately the same amount of actuation may always be used. If it is determined that actuation is not desired, then the strain element coil 170 remains quiescent, via step 220. Step 220 is performed, for example, during a read cycle. If, however, actuation is desired, then the strain element coil 170 is energized with the desired current, via step 230. Thus, the desired current may be driven through the strain element coil 170 during the write cycle of the write head 100. As a result, the strain element 160 experiences a field induced strain and/or magnetostriction. The strain element 160 deforms. A strain is thus exerted on the pole tip 150 and the fly height of the pole tip 150 adjusted locally in the region of the pole tip 150.

Using the method 200, the advantages described above can be achieved. In particular, better defined magnetic transitions, lower power consumption, and a short response time for actuation may be realized. Furthermore, because the method 200 only energizes the strain element coil 170 when desired, for example during writing, the fly height is otherwise maintained. The write cycle typically accounts for less than ten percent of the active time of a disk. When the method 200 is employed to provide dynamic actuation only during writing, dynamic actuation using the strain element and the strain element coil 170 is performed less than ten percent of the active time of the disk. Moreover, the reduction in the fly height is provided locally, in the region of the pole tip. Consequently, mechanical reliability of the drive employing the write head 100 can be preserved.

Figure 4:
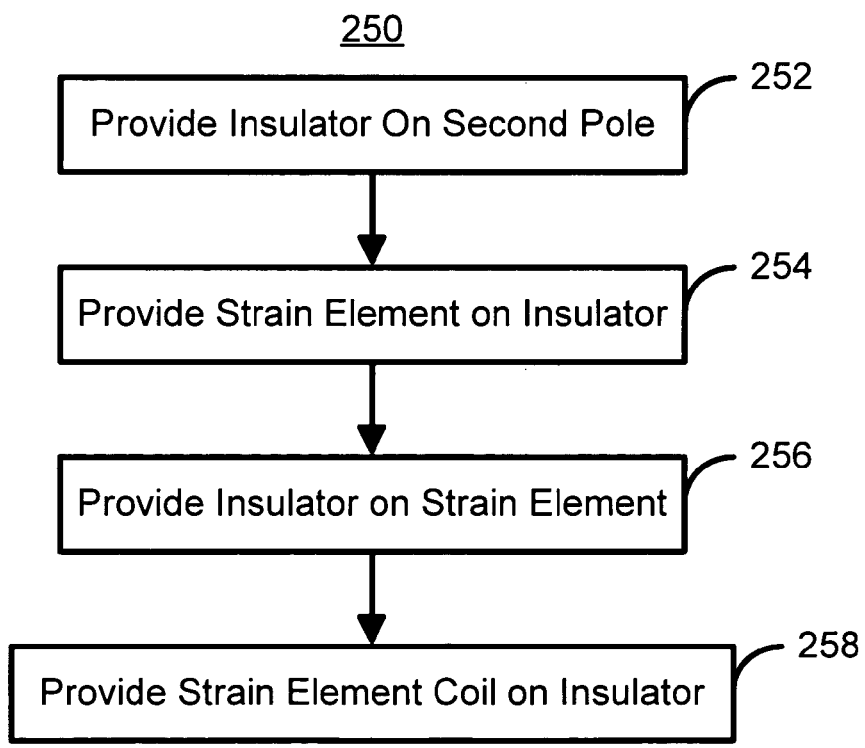
FIG. 4 is a high-level flow chart depicting one embodiment of a method in accordance with the present invention for providing a dynamically actuated write head in accordance with the present invention.

FIG. 4 is a high-level flow chart depicting one embodiment of a method 250 in accordance with the present invention for providing a dynamically actuated write head in accordance with the present invention. The method 250 is preferably performed for the strain element 160 and the strain element coil 170. Thus, the method 250 is described in the context of the write head 100. However, nothing prevents the use of the method 250 with another write head.

The method 250 commences after the P2 130 has been provided. An insulator is provided on the P2 130 to insulate the strain element 160 from the P2 130, via step 252. The strain element 160 is provided, via step 254. Step 254 thus includes depositing the material(s) used in the strain element 160, such as NiMnGa Heusler alloys, Terfenol-D, TbFe monolayers, TbFe/Fe multilayers, FeGa, FeGaAl and/or FePd. In generally, physical vapor deposition is used to deposit the material(s) used in the strain element 160. Also in step 254, the materials are patterned to produce the strain element 160 having the desired shape. In a preferred embodiment, such patterning is performed by providing a patterned photoresist mask on the material(s) and then dry etching. An insulator is provided, via step 256. The insulator provided in step 256 insulates the strain element 160 from the strain element coil 170. The strain element coil is then provided, via step 258. Step 258 could include providing any seed layers, providing a mask having trenches, and electroplating a conductive material such as copper into the trenches. In such an embodiment, the seed layer may be removed after removal of the mask in order to prevent shorting of the strain element coil 170. However, other methods for providing the strain element coil 170 might be used.

Thus, using the method 250, the strain element 160 and strain element coil 170 may be provided using well accepted processes. Consequently, the benefits of dynamic actuation using the strain element 160 and strain element coil 170 can be achieved. In particular, better defined magnetic transitions, lower power consumption, a short response time for actuation, and preservation of the mechanical reliability of a drive incorporating the write head 100 may be realized.

A method and system has been disclosed for dynamically actuating a write head using a strain element. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for actuating a pole tip of a write head, the write head including a first pole and a second pole, the system comprising:

a strain element electrically insulated from the first pole and the second pole, the strain element being configured to produce a strain for actuating the pole tip in response to a magnetic field; and a coil for carrying a current capable of producing the magnetic field at the strain element.

2. The system of claim 1 wherein the pole tip is associated with a fly height and wherein the strain actuates the pole tip by reducing the fly height of the pole tip.

3. The system of claim 2 wherein the strain reduces the fly height of the pole tip by fifty percent.

4. The system of claim 2 wherein the strain reduces the fly height of the pole tip by twenty to thirty Angstroms.

5. The system of claim 1 wherein the strain element further includes a NiMnGa Heusler alloy having a tetragonal martensite structure, the strain being due to a field induced strain in the NiMnGa Heusler alloy.

6. The system of claim 1 wherein the strain element further includes Terfenol-D, the strain being a result of a magnetostriction of the Terfenol-D.

7. The system of claim 1 wherein the strain element further includes an alloy including FeGa, FeGaAl, or FePd, the strain being a result of a magnetostriction of the alloy.

8. A write head comprising:
- a first pole;
- a second pole;
- a write coil residing between the first pole and the second pole;
- a write gap residing between a portion of the first pole and a portion of the second pole;
- a strain element electrically insulated from the second pole, the strain element being configured to produce a strain for actuating the portion of the first pole and the portion of the second pole in response to a magnetic field; and
- a strain element coil for carrying a current capable of producing the magnetic field at the strain element.

9. The write head of claim 8 wherein the pole tip is associated with a fly height and wherein the strain actuates the pole tip by reducing the fly height of the pole tip.

10. The write head of claim 9 wherein the strain reduces the fly height of the pole tip by fifty percent.

11. The write head of claim 9 wherein the strain reduces the fly height of the pole tip by twenty to thirty Angstroms.

12. The write head of claim 8 wherein the strain element further includes a NiMnGa Heusler alloy having a tetragonal martensite structure, the strain being due to a field induced strain in the NiMnGa Heusler alloy.

13. The write head of claim 8 wherein the strain element further includes Terfenol-D, the strain being a result of a magnetostriction of the Terfenol-D.

14. The write head of claim 8 wherein the strain element further includes an alloy including FeGa, FeGaAl, or FePd, the strain being a result of a magnetostriction of the alloy.

15. A method for dynamically actuating a pole tip of a write head, the write head including a first pole and a second pole, the method comprising:
- (a) providing a strain element on the pole tip; and
- (b) driving a current in a strain element coil during a write cycle of the write head, the current capable of producing a magnetic field at the strain element, the strain element being configured to produce a strain for actuating the pole tip in response to the magnetic field.

16. The method of claim 15 wherein the pole tip is associated with a fly height and wherein the strain actuates the pole tip by reducing the fly height of the pole tip.

17. The method of claim 16 current driving step (b) further includes the step of:
- (b1) driving a sufficient current to produce the strain that reduces the fly height of the pole tip by fifty percent.

18. The method of claim 16 wherein the current driving step (b) further includes the step of:
- (b1) driving a sufficient current to produce the strain that reduces the fly height of the pole tip by twenty to thirty Angstroms.

19. The method of claim 15 further comprising the step of:
- (c) allowing the strain element coil to be quiescent during a remaining portion of operation of the write head.

20. The method of claim 15 wherein the strain element further includes a NiMnGa Heusler alloy having a tetragonal martensite structure, the strain being due to a field induced strain in the NiMnGa Heusler alloy.

21. The method of claim 15 wherein the strain element further includes Terfenol-D, the strain being a result of a magnetostriction of the Terfenol-D.

22. The method of claim 15 wherein the strain element further includes an alloy including FeGa, FeGaAl, or FePd, the strain being a result of a magnetostriction of the alloy.

23. A method for providing a system for actuating a pole tip of a write head, the write head including a first pole and a second pole, the method comprising:
- (a) providing a first insulator on the second pole;
- (b) providing a strain element on the first insulator, the strain element being configured to produce a strain for actuating the pole tip in response to a magnetic field;
- (c) providing a second insulator on the strain element; and
- (e) providing a strain element coil on the second insulator, the strain element coil for carrying a current capable of producing the magnetic field at the strain element.

* * * * *